April 22, 1947.  H. T. WOOLSON ET AL  2,419,305
MULTIPLE ENGINE POWER PLANT
Filed Dec. 17, 1942  9 Sheets-Sheet 2

INVENTOR
HARRY T. WOOLSON &
MELBOURNE L. CARPENTIER
BY
ATTORNEYS

April 22, 1947.   H. T. WOOLSON ET AL   2,419,305
MULTIPLE ENGINE POWER PLANT
Filed Dec. 17, 1942   9 Sheets-Sheet 4

INVENTOR
HARRY T. WOOLSON &
MELBOURNE L. CARPENTIER
BY
ATTORNEYS

April 22, 1947. H. T. WOOLSON ET AL 2,419,305
MULTIPLE ENGINE POWER PLANT
Filed Dec. 17, 1942 9 Sheets-Sheet 5

INVENTOR
HARRY T. WOOLSON
MELBOURNE L. CARPENTIER
BY
ATTORNEYS

INVENTOR
HARRY T. WOOLSON &
MELBOURNE L. CARPENTIER
BY
ATTORNEYS

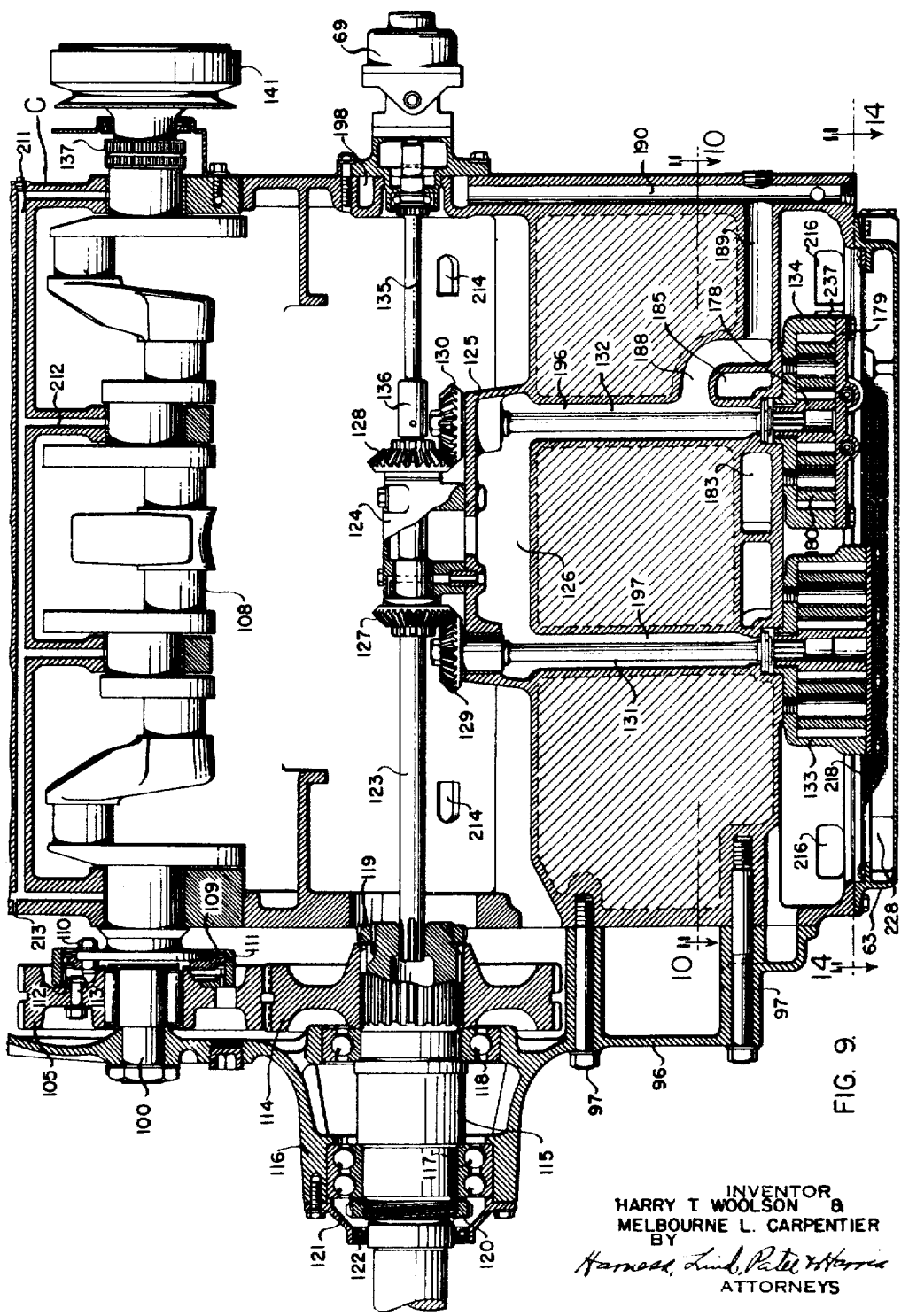

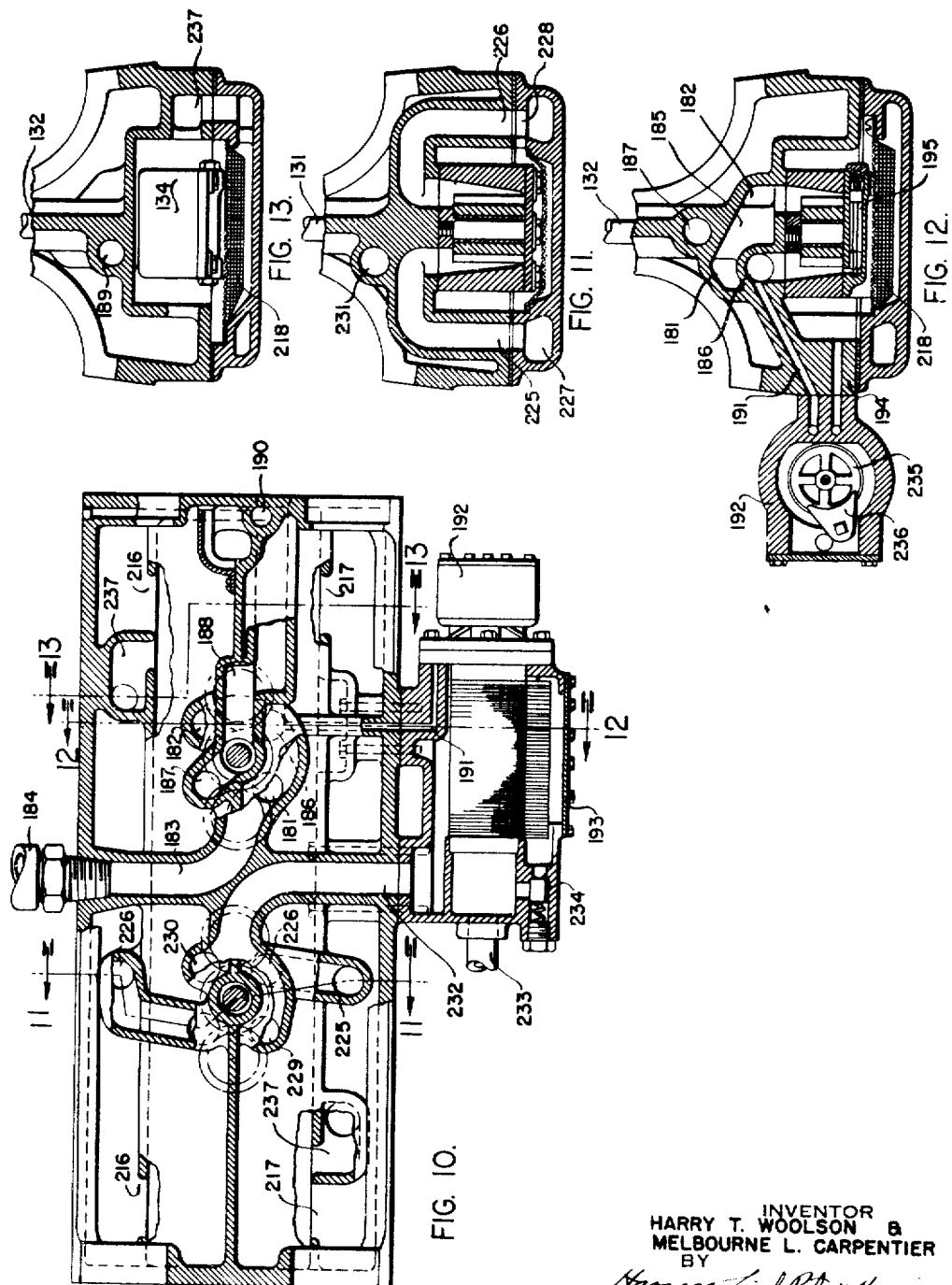

April 22, 1947.	H. T. WOOLSON ET AL	2,419,305
MULTIPLE ENGINE POWER PLANT
Filed Dec. 17, 1942	9 Sheets-Sheet 9

INVENTOR
HARRY T. WOOLSON &
MELBOURNE L. CARPENTIER
BY
ATTORNEYS

Patented Apr. 22, 1947

2,419,305

UNITED STATES PATENT OFFICE 2,419,305

MULTIPLE ENGINE POWER PLANT

Harry T. Woolson and Melbourne L. Carpentier, Detroit, Mich., assignors to Chrysler Corporation, Highland Park, Mich., a corporation of Delaware Application December 17, 1942, Serial No. 469,348

6 Claims. (Cl. 123—55)

This invention relates to multiple engine power plants, and particularly to a power plant which comprises a number of high production, small horsepower engines assembled on a common crankcase.

It is the prime object of the invention to provide a relatively high power output power plant by combining a number of small engines. Tooling for production of large internal combustion engines is an expensive procedure, particularly in cases where a comparatively small number of engines are required. In times of national emergency it may be impossible to obtain tools for manufacturing a new design of engine. The present invention contemplates the use of conventional automobile engines which are easily produced in large quantities and for which production equipment is always available.

By means of our invention it is possible to assemble a number of automobile engines into one large power plant which is light, compact, accessible, easy and cheap to produce, and efficient. Earlier efforts to achieve these results by connecting a number of complete engines in series or parallel through gears, shafts or belts have not been satisfactory because of the excessive bulk and weight of the power plant.

In the arrangement about to be disclosed by way of example, five regular production automobile engines complete except for crankcase are assembled on a common crankcase in circumferentially spaced relation. This arrangement provides an exceedingly compact power plant which resembles a radial engine in appearance.

Referring to the drawings:

Fig. 9 is a longitudinal vertical section taken as indicated by the line 9—9 on Fig. 3.

Fig. 10 is a horizontal section taken as indicated by the line 10—10 in Fig. 9.

Fig. 11 is a section taken along the line 11—11 of Fig. 10.

Fig. 12 is a section taken along line 12—12 of Fig. 10.

Fig. 13 is a section taken along line 13—13 of Fig. 10.

Figure 4:
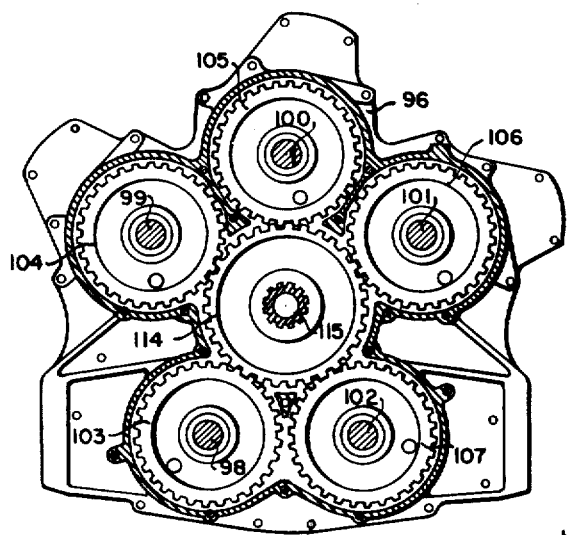
Fig. 4 is a sectional view along the line 4—4 of Fig. 1.
Figure 5:
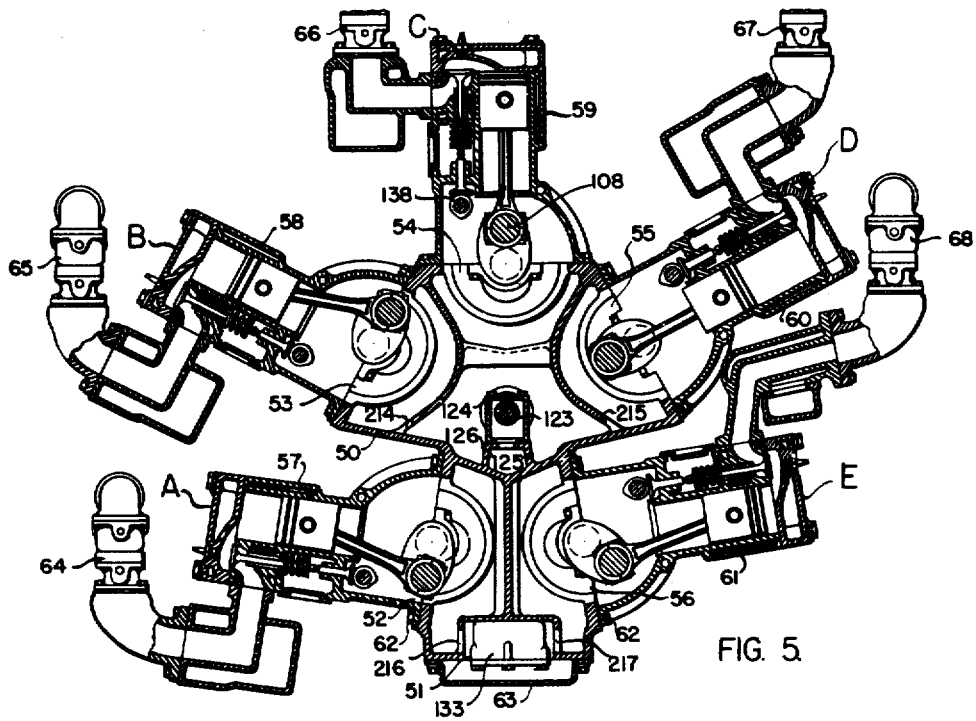
Fig. 5 is a section along line 5—5 of Fig. 1.
Figure 6:
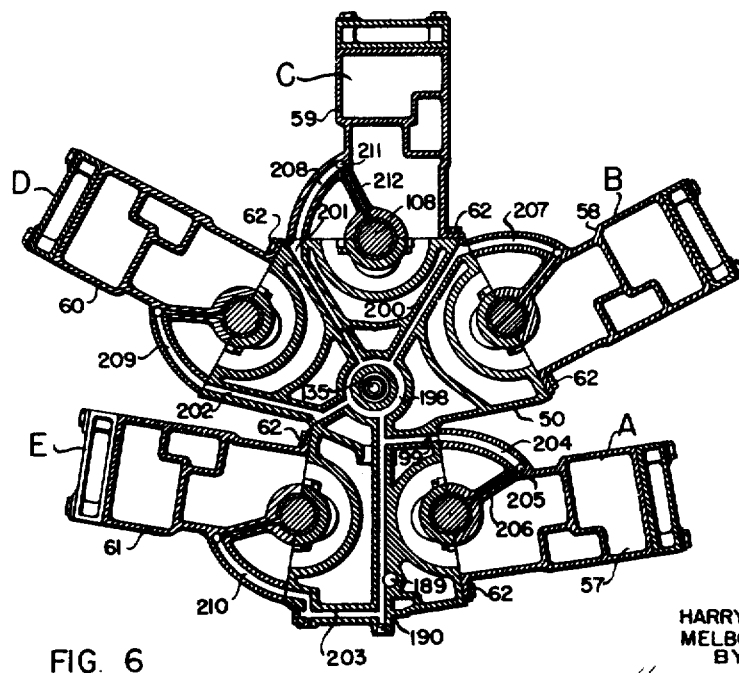
Fig. 6 is a section along line 6—6 of Fig. 1.

As can be seen from Figs. 1 to 7 inclusive, the power plant comprises a central crankcase 50 which is provided with the radially disposed openings 51, 52, 53, 54, 55 and 56. These openings are elongated longitudinally of the case and all but 51 are adapted to receive the crankshaft and associated parts of an engine assembly as is illustrated in Figs. 5 and 6. The engine assemblies, designated A, B, C, D and E respectively, are complete except for crankcases and are substantially regular production automobile engines.

The engine blocks 57, 58, 59, 60 and 61 are secured to the case 50 by hold-down bolts 62 and the engines are arranged in radial circumferentially spaced relation with respect to the longitudinal central axis of the case, the spacing being such that the engines and their accessories are readily accessible.

It will be noted that the central crankcase 50 comprises a structure having a T-shape, of which the sides of the leg of the T are inwardly inclined to the vertical when considered in an upward direction, and the ends of the crossbar of the T are inwardly inclined to the vertical to a slightly greater extent when considered in an upward direction. Thus engines 57 and 61 are relatively closely spaced from one another and extend in opposite directions at angles inclined somewhat above the horizontal from the sides of the legs of the T; engines 58 and 60 are relatively widely spaced from one another and extend in opposite directions at angles inclined to a somewhat greater extent above the horizontal from the ends of the crossbar of the T; and engine 59 extends upwardly from the crossbar of the T. With this arrangement no engine extends downwardly, and in fact all engines extend upwardly to some extent. The result is that all the engines are used in positions that are at least somewhat similar to the positions for a regular production automobile engine, which each of these engines is. Thus the lubrication and cooling of the engines are not disturbed. Furthermore, the overall vertical dimension of the entire assembly is held to a minimum. If the engines simply extended radially from the central crankcase like the spokes of a wheel, some of the engines would be downwardly inclined, thereby causing complications in the cooling and lubrication, and the overall vertical dimension would be considerably increased. In spite of the arrangement of engines, one extending upwardly, two extending generally horizontally in one direction, and two extending generally horizontally in the opposite direction, the engines are satisfactorily spaced about the central structure 50 so that, as seen in Fig. 4, the engine driven gears are relatively well spaced about the central driven gear in balanced relation, and thus a satisfactory loading is established.

The opening 51 at the bottom of the case 50 is covered by an oil pan 63, and an oil pump 134 (Fig. 9) is provided at this location for distributing oil under pressure to each of the engines as will be described.

Each engine is provided with its own fuel induction system including carburetors 64, 65, 66, 67 and 68 which are supplied from a fuel pump 69 (Fig. 7) through flexible fuel lines 70, 71 and 72. The lines 70 and 72 are provided with T-connections 73, 74 respectively so that these lines can feed two carburetors. The pump 69 is connected to a fuel tank (not shown) by a pipe 75.

The exhaust from each engine is connected by means of suitably formed manifolds 76, 77 (Fig. 7) to a single muffler (not shown).

Figure 3:
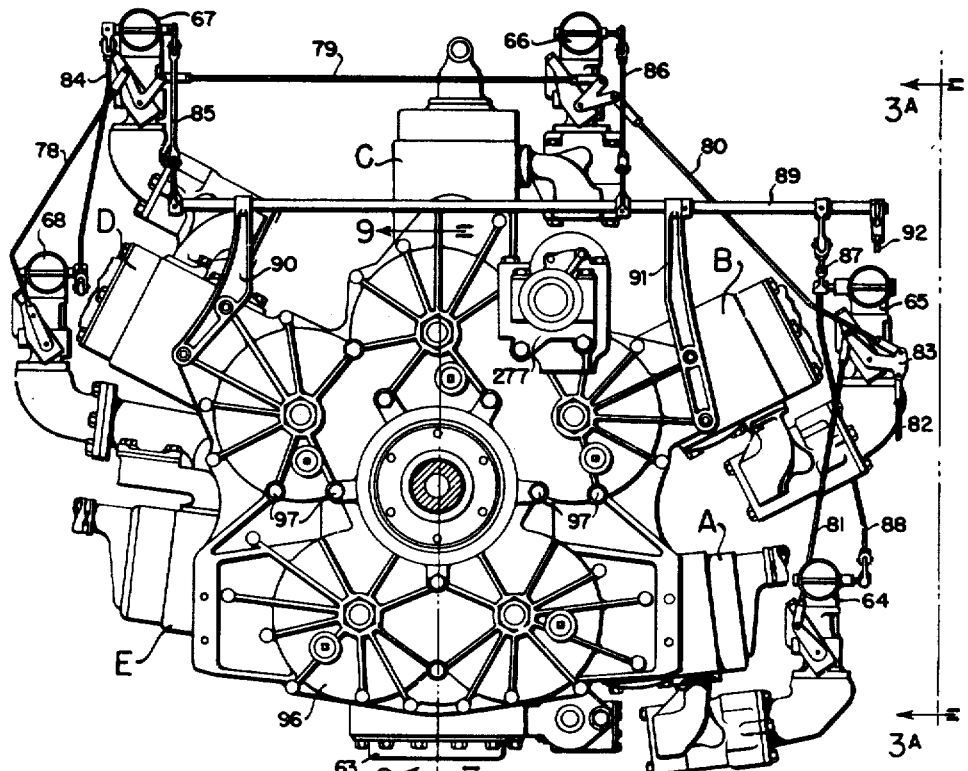
Fig. 3 is a front elevation of the same taken as indicated by the arrow in Fig. 1.
Figure 3A:
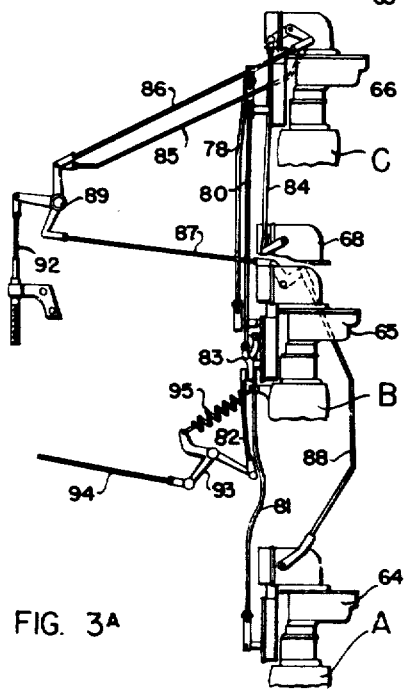
Fig. 3A is an elevational view of the throttle linkage looking in the direction of the arrows in Fig. 3.

All of the carburetor throttle valves are interconnected by a linkage as shown in Figs. 3 and 3A. The link 78 connects carburetor 67 with 68; link 79 connects 66 with 67; link 80 connects 65 with 66, and link 81 connects 64 with 65. Carburetor 65 is provided with bellcrank 83 which connects through a link 82 with the accelerator pedal or other control (not shown) through a bellcrank 93 and link 94. A throttle return spring 95 is suitably connected to lever 93 as shown in Fig. 3A.

The various carburetor choke valves are similarly interconnected by links 84, 85, 86, 87 and 88, and rockshaft 89 which is suitably mounted on the power plant by support members 90, 91 as shown. The shaft is rocked by means of a link 92 which is connected to a choke lever (not shown) for convenient manipulation by the operator.

The crankcase 50 is open at the forward end and a cover plate 96 (Figs. 2, 3, 4 and 9) is detachably secured thereto by studs 97. The cover 96 carries five stationary stub shafts 98, 99, 100, 101 and 102 on which are journaled gears 103, 104, 105, 106 and 107 respectively. These gears are respectively disposed in substantial alignment with the crankshafts of the five engines to which they are drivingly connected.

Fig. 9 illustrates the connection of the gear 105 to the crankshaft 108 of engine C and the other connections are identical. The crankshaft 108 carries an externally toothed element 109 which is bolted to the forward flange thereof by bolts 110. The element 109 fits within and engages an internally toothed element 111 which is in turn carried by an externally toothed element 112 bolted by bolts 113 to the gear 105. This coupling means compensates for any misalignment which may exist between the crankshaft and the gear.

The gears 103 to 107 mesh with a centrally disposed gear 114 carried by a stub axle 115. The latter is rigidly journaled in a central boss 116 and constitutes the output shaft of the power plant. A double row ball bearing 117 and a single row ball bearing 118 rotatably rigidly support the axle 115 in the boss. The gear 114 is splined on the axle 115 as illustrated in Fig. 9 and is retained thereon by a nut 119. A similar nut 120 abuts the bearing 117 at the forward portion of the axle. The boss 116 is closed at the forward end by a cover 121, a suitable seal 122 being provided to exclude dust and dirt.

The axle 115 is internally splined at its rear end for the reception of a shaft 123 the rear end of which is journaled in a member 124. The latter is secured to an integrally cast rib 125 (Figs. 5 and 9) which forms the upper boundary of the main oil pressure chamber 126.

The shaft 123 carries a pair of bevel gears 127, 128 which mesh respectively with the bevel gears 129, 130 carried respectively by the shafts 131, 132. The shaft 131 drives a scavenging pump 133 and the shaft 132 drives a pressure pump 134. These pumps are located in the lowest portion of the crankcase as will be further described.

A shaft 135 connects the shaft 123 with the fuel pump 69 through a flexible joint 136.

Figure 7:
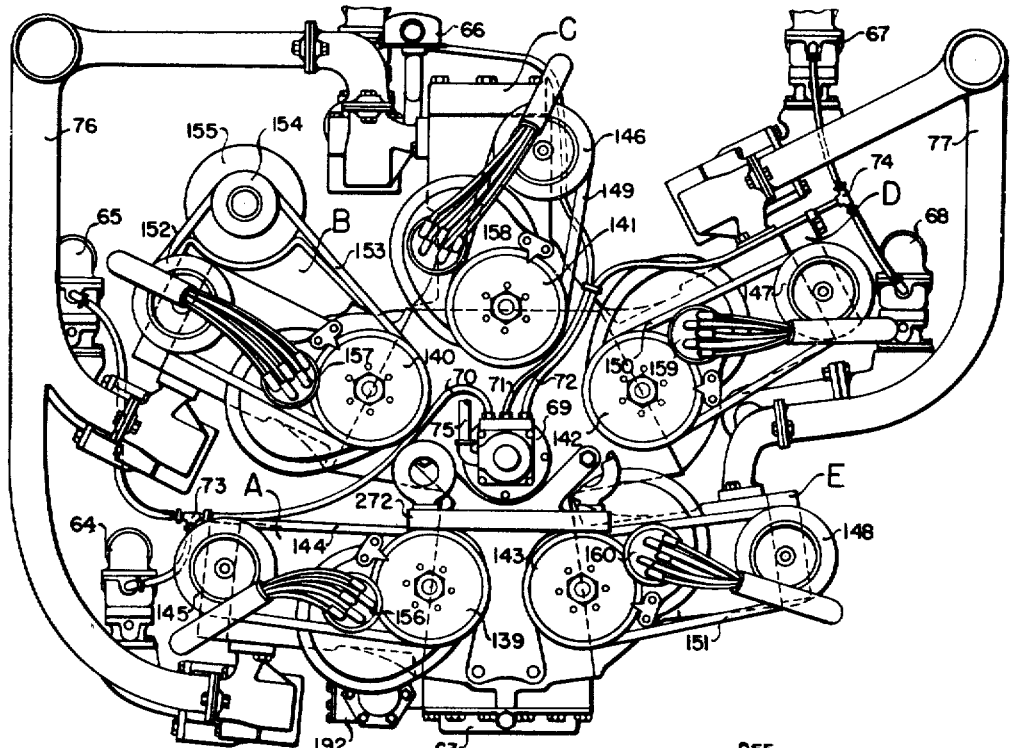
Fig. 7 is a rear elevation of the power plant.

A timing chain sprocket 137 is formed on each crankshaft near the rear end thereof for driving each of the cam shafts 138. On the extreme rear end of the shafts 108 a combined vibration damper and pulley is mounted. These are designated 139, 140, 141, 142 and 143 (Figs. 7 and 9). The pulley 139 of engine A drives a water pump drive pulley 145 through a belt 144. The pulleys 141, 142 and 143 likewise drive the water pump pulleys 146, 147 and 148 of engines C, D and E through belts 149, 150 and 151 respectively. The pulley 140 of engine B drives a water pump pulley 152 through a belt 153 which in addition drives a generator pulley 154 of an electric generator 155. The latter is the electrical supply of the power plant.

Figure 1:
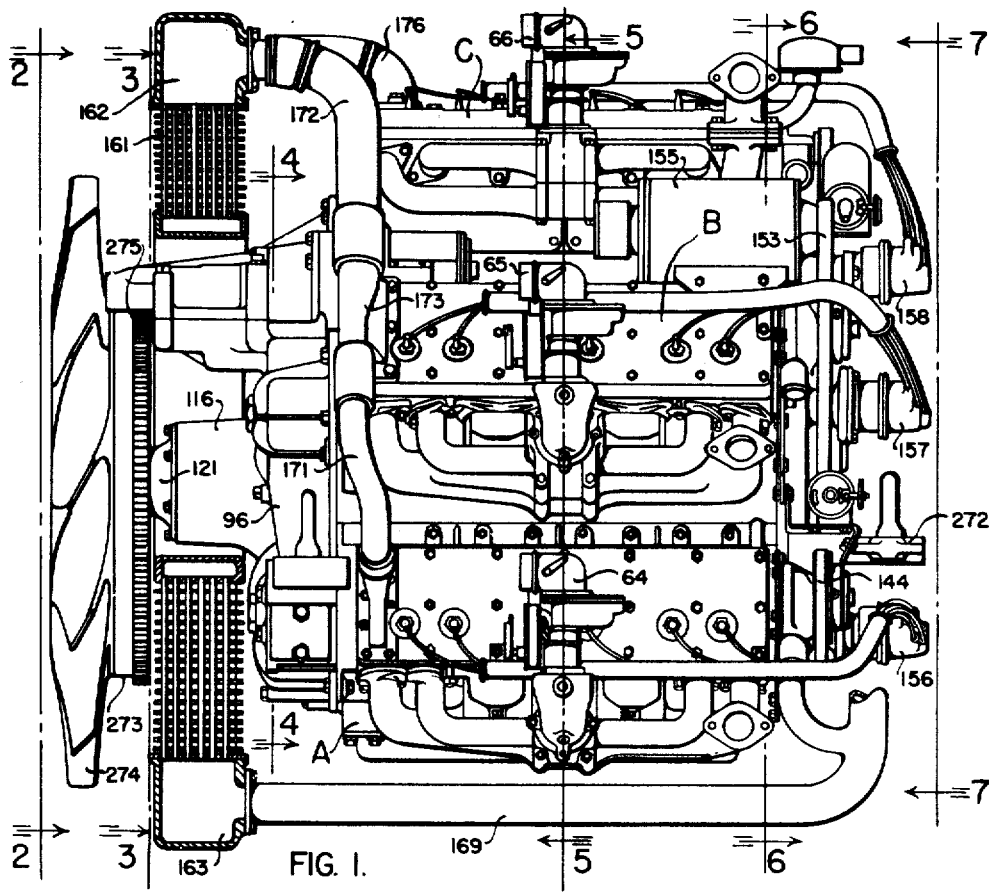
Fig. 1 is a side elevation of the power plant.

Each of the engines has its own distributor which are designated 156, 157, 158, 159 and 160 in Figs. 1 to 7. These distributors supply the spark plug sets on the various engines through wiring in the usual manner as illustrated in Fig. 1.

Figure 2:
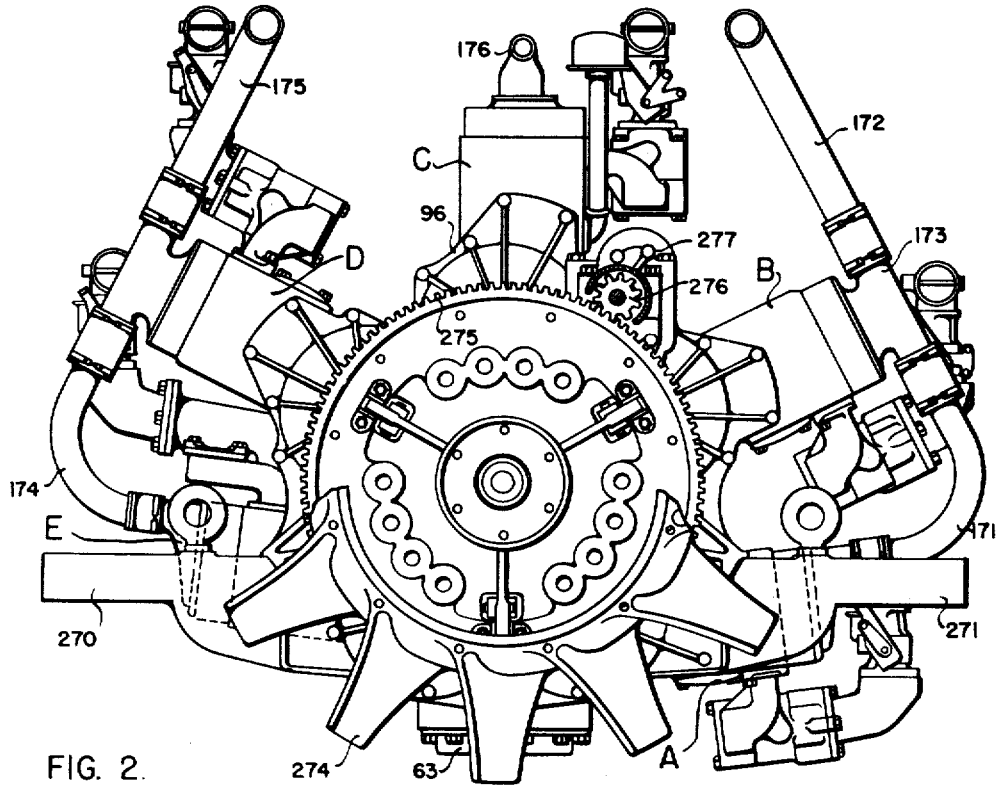
Fig. 2 is an end elevation of the same, the front end being shown.
Figure 8:
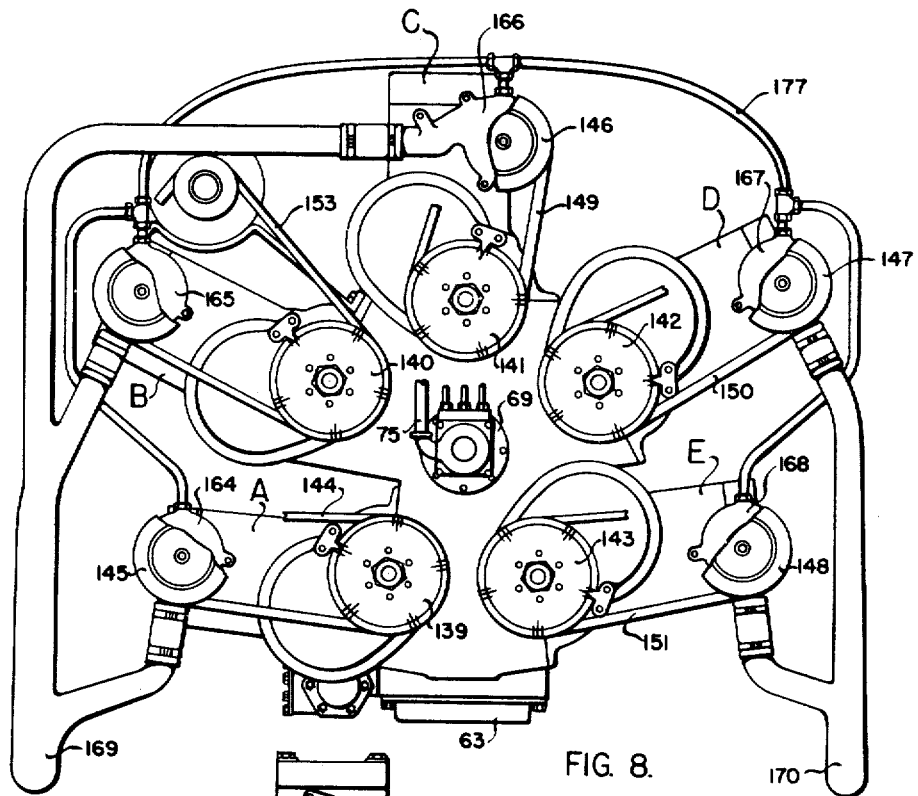
Fig. 8 is a fragmentary rear elevation showing the cooling system.

The conduits of the cooling system for supplying the various engine units are illustrated in Figs. 1, 2 and 8, it being noted that each of the units has its own individual water pump. Referring to Fig. 1 which illustrates the radiator and connections, the radiator has a core 161, an upper tank 162 and a lower tank 163. The coolant fluid is circulated by the water pumps 164, 165, 166, 167 and 168 (Fig. 8) from the lower tank 163 through conduit 169 to engines A, B and C. A similar conduit 170 on the left side of the power plant (as viewed from the front) conducts the fluid to engines D and E.

The coolant after passing through the blocks of engines A and B is returned to the upper radiator tank 162 through conduits 171, 172; the engine B having a special head connection 173 for accommodating the flow. Likewise the coolant from engines D and E is returned to the tank 162 through conduits 174, 175 and that from engine C through conduit 176.

As can be seen from Fig. 8, the high points of the water pumps are interconnected by a system of piping designated generally by the numeral 177, suitable T-connectors being provided where necessary. This arrangement prevents formation of a vacuum in the system which might leave one or more of the engines without coolant.

Referring now to Figs. 9 to 15, it may be seen that the scavenger and pressure pumps 133 and 134 respectively are gear pumps of the 3-gear type. The pressure pump 134 has a central drive gear 178 and driven gears 179, 180. The two suction ports 181 and 182 are open to the main suction conduit 183 which is connected by a hose 184 with the main oil cooling reservoir (not shown). The two are bridged by a passage 185 as shown in Figs. 9 and 12.

The two pressure ports 186 and 187 are bridged by a passage 188 which leads into the main oil gallery 190 by way of passage 189. A bleed passage 191 leads from port 186 to a hydraulic motor 192 which drives an oil filter 193. A return passage 194 returns this oil to the sump. A spring loaded pressure relief valve 195 of known type is provided to relieve the pressure across the pump in the event of an overload.

The gears 127, 128, 129, 130 and their associated bushings are lubricated by oil which flows upwardly through passage 196 into chamber 126. The driving parts of the pumps 133 and 134 receive lubricant through the passages 196 and 197.

The main oil gallery 190 connects with an annular chamber 198 (Figs. 6 and 9) which chamber in turn connects with a series of passages 199, 200, 201, 202 and 203 which are formed in the crankcase 50 at the time of casting. These passages (which are shown in Fig. 6) connect with the regular oil passages of the engine blocks, designated 204, 207, 208, 209 and 210 respectively. These engine oil passages are connected with the crankshaft bearings and other parts of the engine needing lubrication in the manner well known in the art. Some of these connecting passageways are shown in the drawing. For example, numeral 205 designates the main oil gallery of engine A and 206 designates an oil passage which conducts oil from the gallery to a crankshaft bearing. Numerals 211 and 212 indicate similar passages in the block of engine C. The main oil gallery 211 of engine C (see Fig. 9) has an outlet 213 at the forward end of the block which feeds a spray of oil to the gears 105, etc. Engines B and D have similar outlets.

The lubricating oil returns to the sump by way of the openings 214, 215, 216, 217 (Figs. 5 and 9) where it passes through the screen 218 and is picked up by the scavenger pump 133.

The scavenger pump suction ports 225, 226 are independent of each other and connect respectively with either end of the sump pan by means of passages 227 and 228. The pump is thus able to exhaust the sump into the reservoir even though the power plant is tipped at an extreme angle. At such times that the plant is tipped over so that oil is being taken in at only one suction port, one side of the pump is required to handle the entire oil flow. For this reason the scavenger pump 133 is twice as large as the pressure pump 134 and has twice the pumping capacity.

The scavenger pump presssure ports 229, 230 are bridged a passage 231 which is open to a passage 232 which leads to the power driven filter 193. From the filter the oil goes to the reservoir through a pipe 233 (Fig. 10). A by-pass valve 234 of the spring loaded variety permits direct flow around the filter should the passages thereof become clogged. The hydraulic motor 192 rotates a rotary filter element 235 at a very slow rate, approximately one revolution per minute. A fixed element 236 acts as a scraper and continually cleans the filtering passages.

If the screen 218 becomes clogged, the oil level in the sump will rise and the pressure pump 133 will be fed by the by-pass passageway 237 (Fig. 13) which by-passes the screen.

Figure 18:
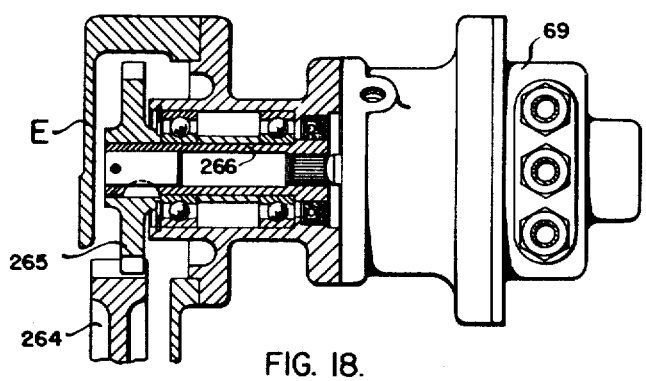
Fig. 18 is a section taken along line 18—18 of Fig. 16.
Figure 17:
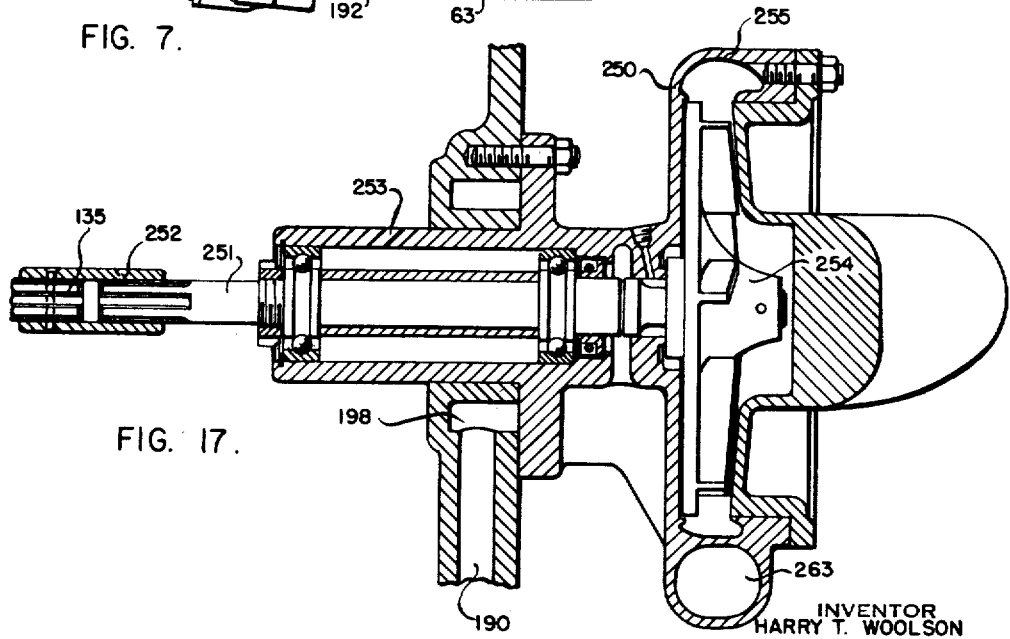
Fig. 17 is a section taken along line 17—17 of Fig. 16.
Figure 16:
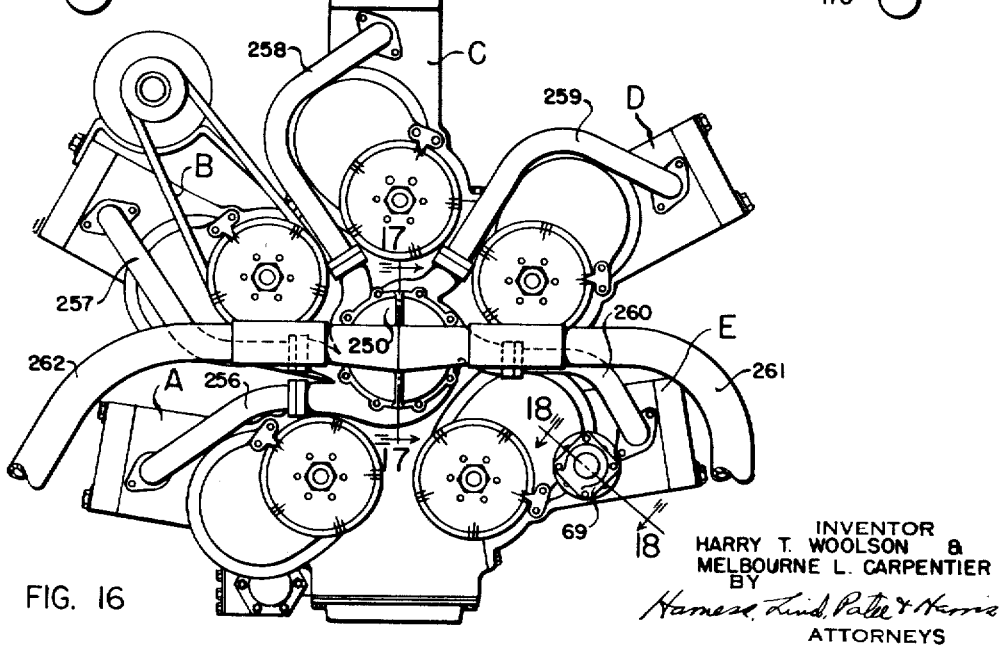
Fig. 16 is a rear elevation of a modified form of power plant.
Figure 14:
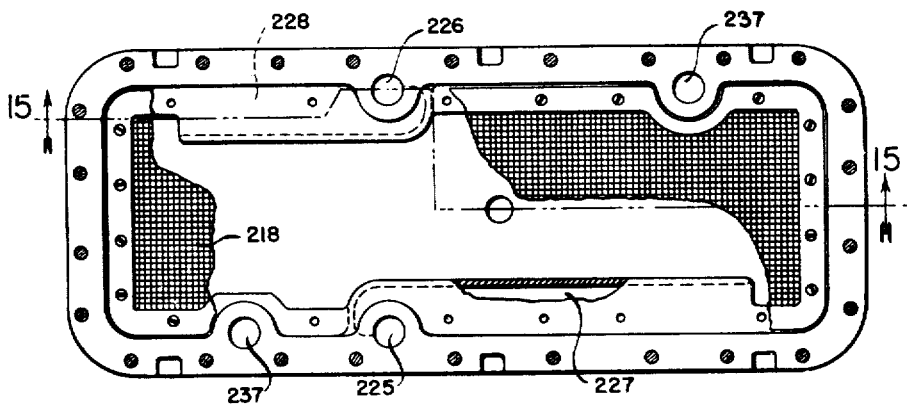
Fig. 14 is a section along line 14—14 of Fig. 9.
Figure 15:
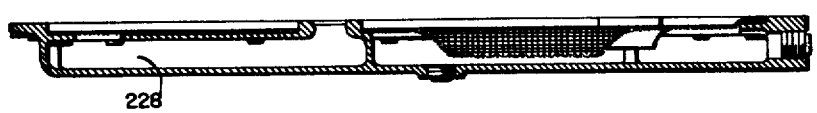
Fig. 15 is a section along line 15—15 of Fig. 14.

Referring now to Figs. 16, 17 and 18, which illustrate modifications of the structure just described, Fig. 16 shows an arrangement wherein one large coolant pump 250 replaces the individual small pumps of the engines. This arrangement results in simplification of the piping and eliminates the tubing 177.

The pump 250 is located at the rear end of the power plant and is driven by the accessory drive shaft 135 (Fig. 17). The pump drive shaft 251 is connected to the shaft 135 by means of a coupling sleeve 252 and is suitably journaled in the rear face of the crankcase casting by means of a journal member 253. A pump impeller 254 supplies coolant under pressure to a pressure manifold 255 from which it is distributed to the various engine units through pipes 256, 257, 258, 259 and 260. A pair of suction pipes 261, 262 connect the inlet manifold 263 with the bottom radiator tank.

This arrangement of the coolant system necessitates relocating the fuel pump. Figs. 16 and 18 show the fuel pump 69 as being driven by the timing gear 264 of engine E, a pump drive gear 265 being keyed on the drive shaft 266 for meshing therewith. The fuel pump may, of course, be driven from any of the other engine units.

The power plant is adapted to be supported at the front end by arms 270, 271. These arms are preferably castings, shaped as shown in Fig. 2, and are bolted to the front cover 96. The rear support comprises a bracket 272 (Figs. 1 and 7) secured to the rear face of the crankcase. It may thus be seen that a three point suspension is provided.

The output shaft 115 carries the flywheel and clutch as illustrated in Figs. 1 and 2, these units being disposed forwardly of the radiator core 161. The flywheel 273 carries a cooling fan 274 and a ring gear 275. The latter is adapted to be engaged by a pinion 276 of a starting motor 277 for starting the power plant, all of the engines being started simultaneously.

It is to be understood that preferred embodiments of our multiple engine power plant have been described and that changes in the size, arrangement and number of engine units, and parts may be made by those skilled in the art without departing from the spirit of our invention.

We claim:

1. A multiple unit power plant comprising a central structure of approximate T-shape, a plurality of engines secured to and extending outwardly from the central structure, one engine being secured to the top of the crossbar of the T, two engines being secured to the ends of the crossbar of the T, and two engines being secured to the opposite sides of the leg of the T, a drive shaft mounted in the central structure, and means drivingly connecting the engines with the drive shaft.

2. A multiple unit power plant comprising a central structure, first and second engines relatively narrowly spaced from one another and extending from opposite sides of the central structure adjacent the base thereof at angles inclined slightly above the horizontal, third and fourth engines relatively widely spaced from one another and extending from opposite sides of the central structure adjacent the top thereof at angles slightly inclined above the horizontal, a fifth engine extending upwardly from the top of the central structure, a drive shaft mounted in the central structure, and means drivingly connecting the five engines with the drive shaft.

3. A multiple unit power plant comprising a central structure of T-shape, first and second engines secured to and extending in opposite directions generally horizontally from opposite sides of the leg of the T, third and fourth engines secured to and extending in opposite directions generally horizontally from opposite ends of the crossbar of the T, a fifth engine secured to and extending upwardly from the top of the crossbar of the T, a drive shaft mounted in the central structure, and means drivingly connecting the five engines with the drive shaft.

4. A multiple unit power plant comprising a central structure of approximate T-shape having the sides of the leg inclined to the vertical when considered in an upward direction and the ends of the crossbar of the T inwardly also inclined to the vertical but at a somewhat greater angle when considered in an upward direction, first and second engines secured to and extending in opposite directions from the sides of the leg of the T at angles somewhat above the horizontal, third and fourth engines secured to and extending in opposite directions from the ends of the crossbar of the T at somewhat greater angles above the horizontal, a fifth engine secured to and extending upwardly from the top of the crossbar of the T, a drive shaft mounted in the central structure, and means drivingly connecting the five engines with the drive shaft.

5. A multiple unit power plant comprising a central structure, a driveshaft mounted within the central structure, a plurality of engines, each engine including a reciprocative piston and a crankshaft driven thereby, the engines being connected with the central structure so that the crankshafts are connected with the driveshaft and spaced thereabout through more than 180° and the pistons reciprocate along lines all on one side of a given line and away from the given line when considered in directions from the crankshafts to the respective pistons.

6. A multiple unit power plant comprising a central structure, first and second engines secured to and extending outwardly from one side of the central structure in generally parallel relation, third and fourth engines secured to and extending outwardly from the opposite side of the central structure in generally parallel relation, the first and third engines being directly opposite one another and being relatively closely spaced, the second and fourth engines being directly opposite one another and being relatively widely spaced, and a fifth engine extending from a region of the central structure located generally between the second and fourth engines and on the side away from the first and third engine, a drive shaft mounted in the central structure, and means drivingly connecting the engines with the drive shaft.

HARRY T. WOOLSON.
MELBOURNE L. CARPENTIER.

REFERENCES CITED

The following references are of record in the file of this patent:

UNITED STATES PATENTS

| Number | Name | Date |
| --- | --- | --- |
| 1,354,535 | Coffman | Oct. 5, 1920 |
| 1,815,868 | Schenk | July 21, 1931 |
| 2,115,660 | Yingling | Apr. 26, 1938 |
| 1,933,292 | Woolson | Oct. 31, 1933 |
| 1,912,507 | Woolson | June 6, 1933 |
| 2,310,220 | De Michelis | Feb. 9, 1943 |
| 1,031,131 | MacFarren | July 2, 1912 |
| 1,101,308 | McSweeney | June 23, 1914 |
| 1,466,321 | Whitcomb | Aug. 28, 1923 |

FOREIGN PATENTS

| Number | Country | Date |
| --- | --- | --- |
| 123,229 | British | 1919 |
| 392,282 | British | 1933 |
| 675,425 | French | 1930 |
| 842,773 | French | 1939 |
| 533,491 | French | 1922 |

---

Certificate of Correction

Patent No. 2,419,305.   April 22, 1947.

HARRY T. WOOLSON ET AL.

It is hereby certified that error appears in the printed specification of the above numbered patent requiring correction as follows: Column 5, line 62, after the word "bridged" insert *by*; and that the said Letters Patent should be read with this correction therein that the same may conform to the record of the case in the Patent Office.

Signed and sealed this 12th day of August, A. D. 1947.

[SEAL]

LESLIE FRAZER,
*First Assistant Commissioner of Patents.* central structure, and means drivingly connecting the five engines with the drive shaft.

3. A multiple unit power plant comprising a central structure of T-shape, first and second engines secured to and extending in opposite directions generally horizontally from opposite sides of the leg of the T, third and fourth engines secured to and extending in opposite directions generally horizontally from opposite ends of the crossbar of the T, a fifth engine secured to and extending upwardly from the top of the crossbar of the T, a drive shaft mounted in the central structure, and means drivingly connecting the five engines with the drive shaft.

4. A multiple unit power plant comprising a central structure of approximate T-shape having the sides of the leg inclined to the vertical when considered in an upward direction and the ends of the crossbar of the T inwardly also inclined to the vertical but at a somewhat greater angle when considered in an upward direction, first and second engines secured to and extending in opposite directions from the sides of the leg of the T at angles somewhat above the horizontal, third and fourth engines secured to and extending in opposite directions from the ends of the crossbar of the T at somewhat greater angles above the horizontal, a fifth engine secured to and extending upwardly from the top of the crossbar of the T, a drive shaft mounted in the central structure, and means drivingly connecting the five engines with the drive shaft.

5. A multiple unit power plant comprising a central structure, a driveshaft mounted within the central structure, a plurality of engines, each engine including a reciprocative piston and a crankshaft driven thereby, the engines being connected with the central structure so that the crankshafts are connected with the driveshaft and spaced thereabout through more than 180° and the pistons reciprocate along lines all on one side of a given line and away from the given line when considered in directions from the crankshafts to the respective pistons.

6. A multiple unit power plant comprising a central structure, first and second engines secured to and extending outwardly from one side of the central structure in generally parallel relation, third and fourth engines secured to and extending outwardly from the opposite side of the central structure in generally parallel relation, the first and third engines being directly opposite one another and being relatively closely spaced, the second and fourth engines being directly opposite one another and being relatively widely spaced, and a fifth engine extending from a region of the central structure located generally between the second and fourth engines and on the side away from the first and third engine, a drive shaft mounted in the central structure, and means drivingly connecting the engines with the drive shaft.

HARRY T. WOOLSON.
MELBOURNE L. CARPENTIER.

REFERENCES CITED

The following references are of record in the file of this patent:

UNITED STATES PATENTS

| Number | Name | Date |
|---|---|---|
| 1,354,535 | Coffman | Oct. 5, 1920 |
| 1,815,868 | Schenk | July 21, 1931 |
| 2,115,660 | Yingling | Apr. 26, 1938 |
| 1,933,292 | Woolson | Oct. 31, 1933 |
| 1,912,507 | Woolson | June 6, 1933 |
| 2,310,220 | De Michelis | Feb. 9, 1943 |
| 1,031,131 | MacFarren | July 2, 1912 |
| 1,101,308 | McSweeney | June 23, 1914 |
| 1,466,321 | Whitcomb | Aug. 28, 1923 |

FOREIGN PATENTS

| Number | Country | Date |
|---|---|---|
| 123,229 | British | 1919 |
| 392,282 | British | 1933 |
| 675,425 | French | 1930 |
| 842,773 | French | 1939 |
| 533,491 | French | 1922 |

---

Certificate of Correction

Patent No. 2,419,305.   April 22, 1947.

HARRY T. WOOLSON ET AL.

It is hereby certified that error appears in the printed specification of the above numbered patent requiring correction as follows: Column 5, line 62, after the word "bridged" insert *by*; and that the said Letters Patent should be read with this correction therein that the same may conform to the record of the case in the Patent Office.

Signed and sealed this 12th day of August, A. D. 1947.

[SEAL]

LESLIE FRAZER,
*First Assistant Commissioner of Patents.*